United States Patent
Noori et al.

(10) Patent No.: US 10,211,871 B2
(45) Date of Patent: Feb. 19, 2019

(54) ACCESSORY CASE FOR WIRELESS ELECTRONIC DEVICE

(71) Applicant: Apple Inc., Cupertino, CA (US)

(72) Inventors: Basim H. Noori, San Jose, CA (US);
Khan M. Salam, Dublin, CA (US);
Matthew A. Mow, Los Altos, CA (US);
Yi Jiang, Sunnyvale, CA (US); Yuehui Ouyang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 14/966,421

(22) Filed: Dec. 11, 2015

(65) Prior Publication Data

US 2017/0170859 A1 Jun. 15, 2017

(51) Int. Cl.
*H04B 1/3883* (2015.01)
*H04B 1/3888* (2015.01)
(Continued)

(52) U.S. Cl.
CPC ............ *H04B 1/3883* (2013.01); *H02J 7/025* (2013.01); *H02J 50/23* (2016.02); *H02J 50/27* (2016.02);
(Continued)

(58) Field of Classification Search
CPC .......... H04M 1/7253; H04M 1/72527; H04M 1/6041; H04M 1/6058; H04M 1/6066; H04M 1/05; H04M 2250/02; H04M 1/6075; H04M 1/6083; H04M 1/6091; H04B 1/3877; H04B 1/3883; H04B 5/0037;
(Continued)

(56) References Cited

U.S. PATENT DOCUMENTS 6,873,293 B2 * 3/2005 Proctor, Jr. ............ H01Q 1/242
343/702
8,175,542 B2 * 5/2012 Nandagopalan ......... H01Q 3/30
455/562.1
(Continued)

FOREIGN PATENT DOCUMENTS

| KR | 20090079720 | 7/2009 | |
|---|---|---|---|
| KR | 101496191 | 2/2015 | |
| WO | WO 2015075500 A1 * | 5/2015 | ........... G06F 1/1632 |

*Primary Examiner* — Olumide Ajibade Akonai
(74) *Attorney, Agent, or Firm* — Treyz Law Group, P.C.; G. Victor Treyz; Joseph F. Guihan (57) ABSTRACT

A removable case may have a body that is configured to receive an electronic device. The case may be coupled to the electronic device using wired and wireless paths. The case may include circuitry that receives wireless power from external equipment. The circuitry that receives the wireless power may receive wireless power at microwave frequencies. Received power may be supplied to the electronic device through wired and wireless paths. The removable case may also include circuitry that wirelessly communicates with external equipment. An array of antennas may be used to support beam steering. The array of antennas may support wireless communications in millimeter wave communications bands such as a communications band at 60 GHz or other extremely high frequency communications bands. The case and electronic device may have respective intermediate frequency antenna structures to allow intermediate frequency signals to be wirelessly conveyed between the case and device.

19 Claims, 6 Drawing Sheets

(51) Int. Cl.
*H02J 50/27* (2016.01)
*H04B 7/06* (2006.01)
*H02J 7/02* (2016.01)
*H04B 5/00* (2006.01)
*H02J 50/23* (2016.01)

(52) U.S. Cl.
CPC ......... *H04B 1/3888* (2013.01); *H04B 5/0031* (2013.01); *H04B 5/0037* (2013.01); *H04B 7/0617* (2013.01)

(58) Field of Classification Search
CPC .... H04B 5/0081; H04B 7/0617; H04B 17/12; H04B 1/3888; H03F 2200/102; H03G 3/3042; H02J 7/025; H02J 50/80; H02J 5/005; H02J 17/00; H02J 50/10; H02J 50/50; H02J 7/0052; H02J 7/0013; H02J 7/0027; H02J 7/0044; H02J 7/007; H02J 5/00; H04W 88/02; H04W 4/008; H04W 16/28; H04W 24/02; H01Q 1/243; H01Q 1/241; H01Q 3/2605; H01Q 5/00; H01Q 5/321; H01Q 1/38
USPC .................. 455/90.3, 572, 573, 575.1, 575.8
See application file for complete search history.

(56) References Cited

U.S. PATENT DOCUMENTS

| | | | |
|---|---|---|---|
| 8,442,602 B2 | 5/2013 | Wong et al. | |
| 9,026,187 B2* | 5/2015 | Huang | H05K 5/0086 455/41.1 |
| 9,490,653 B2* | 11/2016 | Shevde | H02J 7/025 |
| 2009/0111531 A1* | 4/2009 | Cui | H01Q 1/243 455/572 |
| 2010/0184493 A1* | 7/2010 | Lin | H01Q 1/243 455/575.7 |
| 2010/0231452 A1* | 9/2010 | Babakhani | G01S 7/032 342/368 |
| 2010/0261501 A1* | 10/2010 | Behzad | H04B 1/001 455/552.1 |
| 2010/0321253 A1* | 12/2010 | Ayala Vazquez | H01Q 1/2258 343/702 |
| 2011/0096763 A1* | 4/2011 | Qi | H04B 1/3833 370/338 |
| 2011/0156640 A1* | 6/2011 | Moshfeghi | H02J 7/025 320/108 |
| 2012/0088555 A1* | 4/2012 | Hu | H04B 1/3883 455/573 |
| 2013/0237294 A1* | 9/2013 | Periyalwar | H04B 7/0689 455/575.7 |
| 2013/0260675 A1* | 10/2013 | Chan | H04B 5/0062 455/41.1 |
| 2013/0264997 A1* | 10/2013 | Lee | H04B 5/0037 320/106 |
| 2014/0226300 A1 | 8/2014 | O'Neill et al. | |
| 2015/0087248 A1* | 3/2015 | Yehezkely | H04B 1/0007 455/84 |
| 2015/0207207 A1* | 7/2015 | Park | H01Q 1/243 343/702 |
| 2016/0056635 A1* | 2/2016 | Bell | H02J 7/025 713/300 |
| 2016/0099614 A1* | 4/2016 | Leabman | H01Q 1/243 307/104 |
| 2016/0105048 A1* | 4/2016 | Lee | H02J 7/04 320/108 |
| 2016/0134142 A1* | 5/2016 | Murphy | H02J 7/0054 455/573 |
| 2016/0380346 A1* | 12/2016 | Komulainen | H01Q 1/521 343/841 |

\* cited by examiner

ACCESSORY CASE FOR WIRELESS ELECTRONIC DEVICE

BACKGROUND

This relates generally to removable cases for electronic devices and, more particularly, to removable cases for wireless electronic devices.

Electronic devices often include wireless circuitry. For example, cellular telephones, computers, and other devices often contain antennas for supporting wireless communications with external equipment. Some wireless devices contain loop antennas that allow batteries in the wireless devices to be wirelessly charged.

Removable cases are sometimes used with electronic devices. Removable cases can provide physical protection for an electronic device and may contain batteries to provide supplemental power, but do not provide significant enhanced functionality.

It would therefore be desirable to be able to provide improved removable cases for wireless devices.

SUMMARY

A removable case may have a body that is configured to receive an electronic device. The removable case may include a battery that supplements the battery of the electronic device.

The removable case may be coupled to the electronic device using wired and wireless paths. These paths may be used to convey power and data between the case and the electronic device.

The removable case may include circuitry that receives wireless power from external equipment. The circuitry that receives the wireless power may receive wireless power at microwave frequencies. Received power may be supplied to the electronic device through wired and wireless paths.

The removable case may also include circuitry that wirelessly communicates with external equipment. An array of antennas may be used to support beam steering. The array of antennas may support wireless communications in millimeter wave communications bands such as a communications band at 60 GHz or other extremely high frequency communications bands. The case and electronic device may have respective intermediate frequency antenna structures to allow intermediate frequency signals to be wirelessly conveyed between the case and device.

DETAILED DESCRIPTION

Electronic devices may be provided with removable external cases. The removable external cases may contain components that add functionality to the electronic devices such as wireless functions. The wireless functions may include, for example, wireless communications capabilities and wireless power transfer capabilities.

Figure 1:
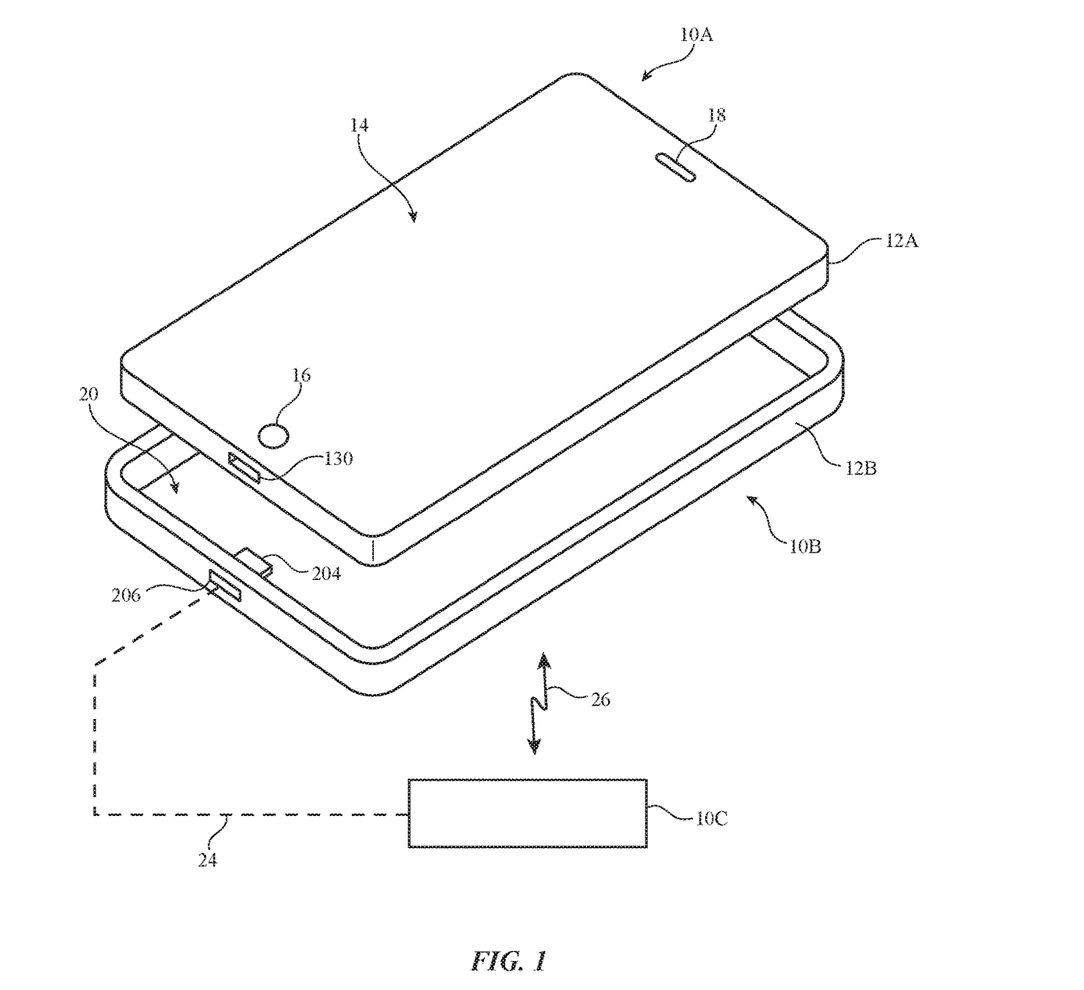
FIG. 1 is a perspective view of an illustrative electronic device and a mating removable case in accordance with an embodiment.

An illustrative electronic device (device 10A), a mating removable case (case 10B), and external wireless equipment 10C are shown in the exploded perspective view of FIG. 1. Device 10A may have a housing (body) such as housing 12A. Display 14 may be mounted in housing 12A. Openings may be formed in the front face of device 10A. For example, openings may be formed in a protective display cover layer for display 14 such as an opening for button 16 and speaker port 18.

Electronic device 10A and mating case 10B may have any suitable shapes. For example, housing 12A of electronic device 10A may have a rectangular shape and case 10B may have a body (housing) such as body 12B with a corresponding rectangular recess. Rectangular recess 20 of body 12B may be configured to receive a rectangular device such as electronic device 10A of FIG. 1. Electronic devices and cases of other shapes may be used, if desired. For example, a case may have a folding cover, may have the shape of a sleeve that slides over an electronic device, may be mounted to only one end of an electronic device, or may have other suitable shapes that are configured to mate with an electronic device. Structures such as housing 12A and body 12B may be formed from materials such as plastic, glass, metal, other materials, and/or combinations of these materials.

Device 10A may have a connector port with a connector such as female connector 130. Connector 130 may have signal pins and power pins (sometimes referred to as contacts, signal paths, or signal lines). For example, connector 130 may have 5-20 contacts, 16 contacts, 8 contacts, more than 3 contacts, or fewer than 32 contacts. Case 10B may have a mating connector such as male connector 204. When device 10 is mounted in case 10B, connector 204 and connector 130 may be coupled to each other (i.e., the contacts of connector 204 may mate with corresponding contacts in connector 130). A battery in case 10B may supply supplemental power to device 10A by routing power signals to the circuitry of device 10A through power pins in connectors 204 and 130. Data and control signals may also be routed between device 10A and case 10B using connectors 130 and 204.

Connector 204 may be coupled to female connector 206 in case 10B. When it is desired to use an accessory or other external equipment with device 10A (see, e.g., external equipment 10C), an external plug (e.g., a plug on the end of an accessory cable or a plug in a dock or other plug associated with wired path 24) may be inserted into connector 206. Internal wiring in case 10B may route signals from contacts in the plug coupled to connector 206 to corresponding contacts in connector 204. Because connector 204 is coupled to connector 130, this allows signals from case 10B and/or external signals from path 24 and equipment 10C to be routed to and from device 10A. External equipment 10C may also be coupled to device 10A and/or case 12B wirelessly (see, e.g., wireless link 26).

A schematic diagram of illustrative circuitry that may be used in device 10A, case 10B, and/or external equipment 10C is shown in FIG. 1. Circuitry 10 of FIG. 2 may be associated with all or part of device 10A, all or part of case 10B, and/or all or part of external equipment 10C. Circuitry 10 (and therefore device 10A, case 10B, and/or equipment 10C) may include and/or may be based on equipment such as a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, a wireless access point, a wireless communications station, a wireless charging station, charging equipment for supplying wireless power and/or wired power to recharge depleted batteries and/or to otherwise help power electronic equipment, or other electronic equipment.

Figure 2:
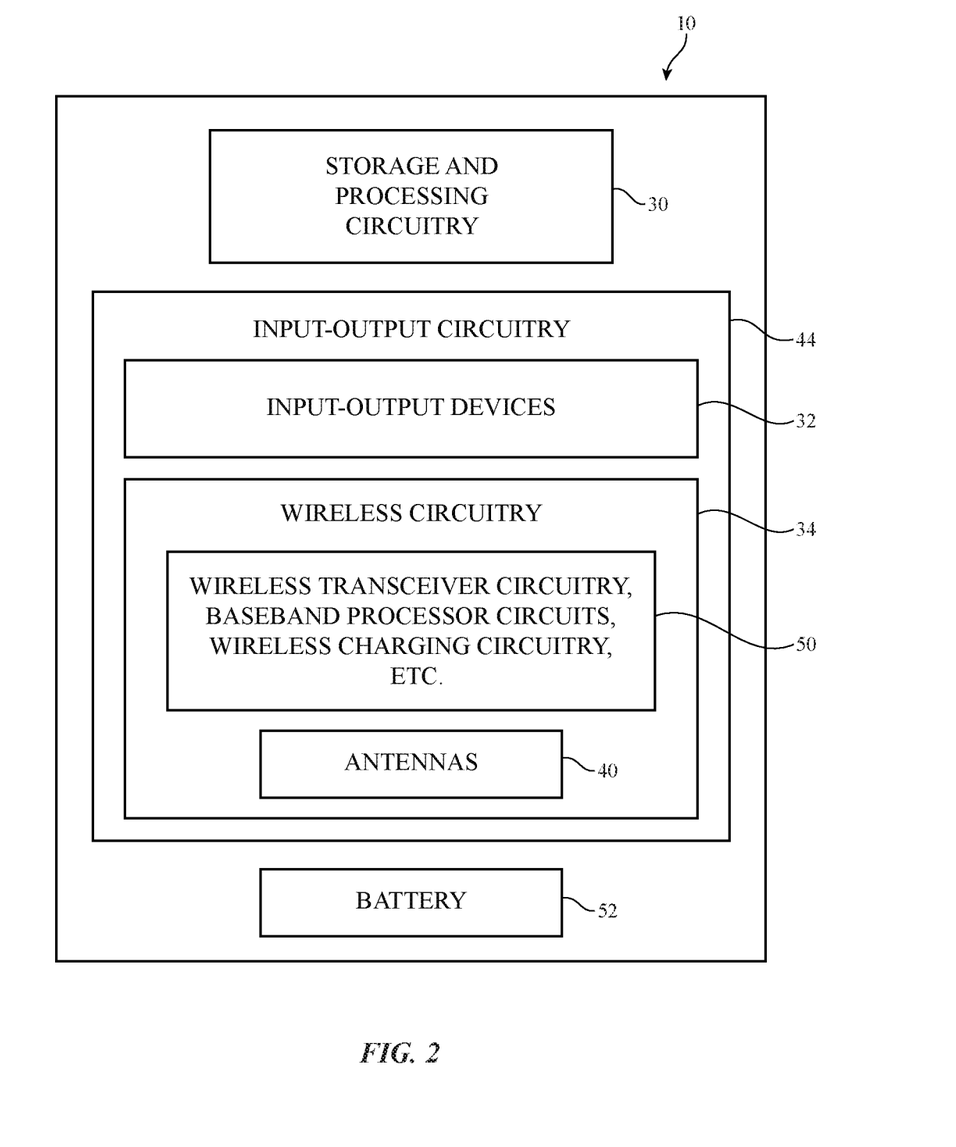
FIG. 2 is a schematic diagram of illustrative circuitry for use in an electronic device, removable case, and external equipment in accordance with an embodiment.

As shown in FIG. 2, circuitry 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of circuitry 10. This processing circuitry may be based on one or more microprocessors, microcontrollers, digital signal processors, baseband processor integrated circuits, application specific integrated circuits, etc.

Storage and processing circuitry 30 may be used to run software on circuitry 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Circuitry 10 may include input-output circuitry 44. Input-output circuitry 44 may include input-output devices 32. Input-output devices 32 may be used to allow data to be supplied to circuitry 10 and to allow data to be provided from circuitry 10 to external devices. Input-output devices 32 may include user interface devices, data port devices, and other input-output components. For example, input-output devices may include displays such as touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether circuitry 10 in one device is coupled to circuitry in another device, and other sensors and input-output components.

Input-output circuitry 44 may include wireless circuitry 34 for communicating wirelessly with external equipment. Wireless circuitry 34 may include antenna structures such as one or more antennas 40 and wireless circuitry 50.

Antennas 40 in wireless circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different applications (e.g., different operating frequencies, different combinations of communications bands, near field versus far field communications, etc.). As an example, one type of antenna may be used in forming a local wireless link antenna and another type of antenna may be used in forming a remote wireless link antenna. One type of antenna may also be used in handling data communications whereas another type of antenna may be used in supporting wireless power transfer. In another illustrative configuration, one type of antenna may be used in supporting near field communications, whereas another type of antenna may be used for supporting far field communications. Other arrangements may be used, if desired. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays and other antenna structures for handling millimeter wave communications, for handling near field communications, for handling communications from 700-2700 MHz, or for handling communications at other suitable frequencies. The phase antenna arrays may allow beams of signals (transmitted and/or received) to be steered in real time (e.g., to optimize wireless communications and/or wireless power transfer).

Wireless circuitry 50 may include baseband processors, transceiver circuits, upconverter and downconverter circuits, circuits for controlling the operation of antennas in antenna arrays, power circuitry (e.g., wireless charging circuitry for supporting wireless charging at microwave frequencies, at frequencies of 10 kHz to 100 MHz, or other at other frequencies), transceiver circuitry for handling wireless communications, and other wireless circuitry. The transceiver circuitry of circuitry 50 may include wireless local area network transceiver circuitry that may handle 2.4 GHz and 5 GHz bands for WiFi® (IEEE 802.11) communications and that may handle the 2.4 GHz Bluetooth® communications band, may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples), may include millimeter wave transceiver circuitry to support communications at extremely high frequencies (e.g., millimeter wave frequencies from 10 GHz to 400 GHz or other millimeter wave frequencies), may include satellite navigation system circuitry such as Global Positioning System (GPS) receiver circuitry for receiving GPS signals at 1575 MHz or for handling other satellite positioning data (e.g., GLONASS signals at 1609 MHz), may include circuitry for receiving television and radio signals, paging system signals, near field communications (NFC) (e.g., NFC signals below 100 MHz), signals at frequencies greater than 60 GHz, and other wireless signals.

Circuitry 10 may include power storage devices such as capacitors and/or batteries such as battery 52.

Figure 3:
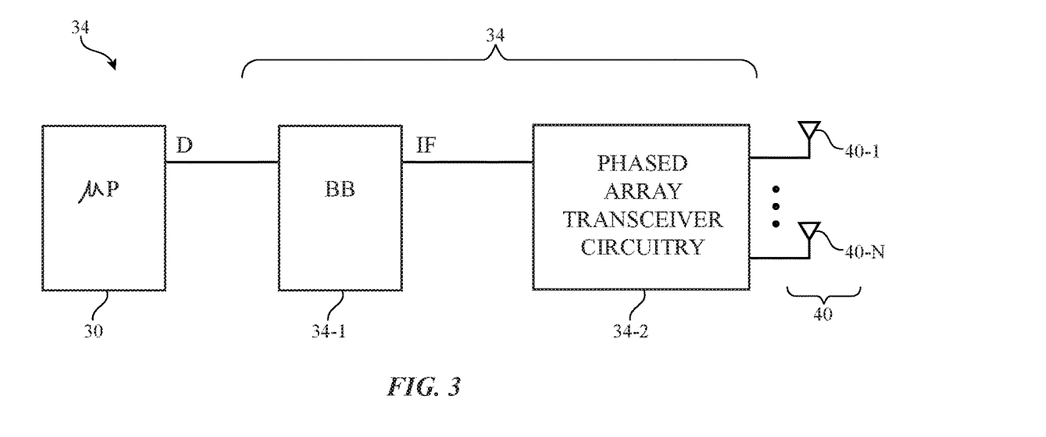
FIG. 3 is a circuit diagram of illustrative circuitry for controlling a phased antenna array to implement functions such as beam steering functions in accordance with an embodiment.

It may be desirable to transmit and receive wireless signals using an array of antennas. Illustrative circuitry of the type that may be used in transmitting and receiving wireless communications signals with an antenna array is shown in FIG. 3. Control circuitry 30 (e.g., microprocessor circuitry, etc.) may generate and receive data signals D. One or more data paths (e.g., data buses) may be used to convey data signals between control circuitry 30 and wireless circuitry 34. Wireless circuitry 34 may be coupled between control circuitry 30 and an array of antennas 40 (e.g., antennas 40-1 . . . 40-N).

Wireless circuitry 34 may include circuits such as baseband processor integrated circuit 34-1 that communicate with control circuitry 30 over data buses D. Baseband processor circuitry such as processor 34-1 may transmit and receive intermediate frequency signals IF. Circuitry 34-2 may be coupled between baseband processor circuitry 34-1 and antenna array 40. Circuitry 34-2 may include upconverter circuitry for converting intermediate frequency signals IF into radio-frequency signals for antennas 40 and downconverter circuitry for converting radio-frequency antenna signals from antennas 40 into intermediate frequency signals IF. Circuitry 34-2 may also include radio-frequency transceiver circuitry and circuitry that controls the relative phase and amplitude of signals associated with respective antennas 40 in the antenna array (e.g., to implement beam steering).

Intermediate frequency signals IF may have a frequency that lies between the frequency of the data signals D and the radio-frequency signals that are wirelessly transmitted and received using antennas 40. For example, if the radio-frequency signals are extremely high frequency (EHF) signals such as 60 GHz signals or signals above 60 GHz (as an example) and data signals D have frequencies of 1-2 GHz or less (as an example), intermediate frequency signals IF may have frequencies of about 5-15 GHz (as an example). Other frequency ranges may be used for the signals in wireless circuitry 34 (e.g., frequencies below 100 MHz, etc.). These are merely illustrative frequency ranges.

Figure 4:
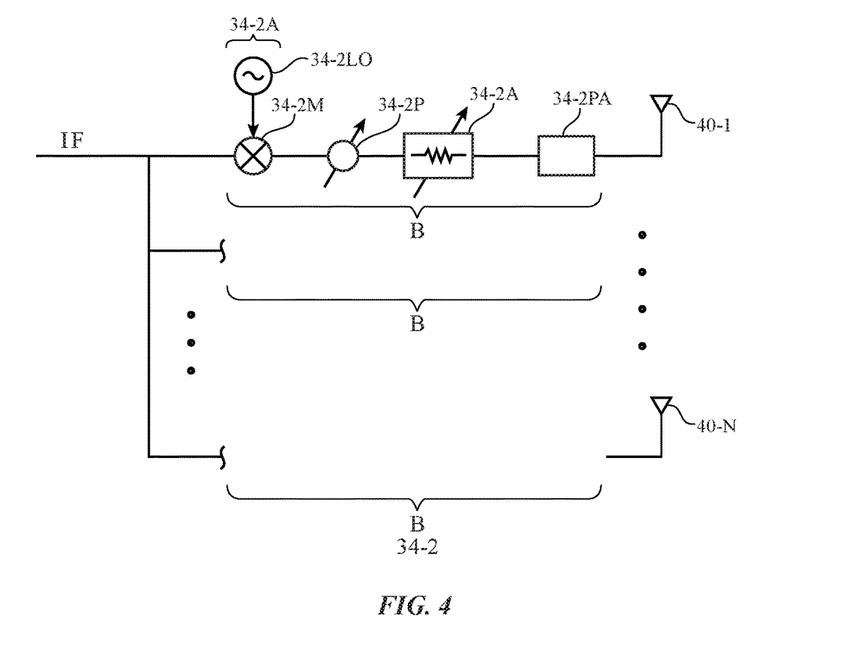
FIG. 4 is a circuit diagram of illustrative circuitry that may be used in the circuits of FIG. 3 to handle phased antenna array wireless communications signals in accordance with an embodiment.

As shown in FIG. 4, wireless circuitry 34-2 may include multiple branches B, each of which is associated with a respective antenna. Each branch B may include circuitry such as upconverter/downconverter 34-2A (e.g., local oscillator 34-2LO and mixer 34-2M), adjustable phase retarder 34-2P, adjustable attenuator 34-2A, and amplifier circuitry 34-2PA (e.g., a power amplifier for amplifying transmitted antenna signals, a low noise amplifier for amplifying received antenna signals, etc.). The circuitry of branches B may include paths that bypass phase adjustment and amplitude adjustment circuitry such as 34-2P and 34-2A, may include separate outgoing and incoming paths (e.g., an outgoing path with an upconverter and an incoming path with a downconverter), and/or may include other wireless circuitry. The example of FIG. 4 is merely illustrative. Phase and magnitude adjustments of the signals in branches B may allow beam steering operations and other array-based operations to be performed with the antennas of the antenna array.

Figure 5:
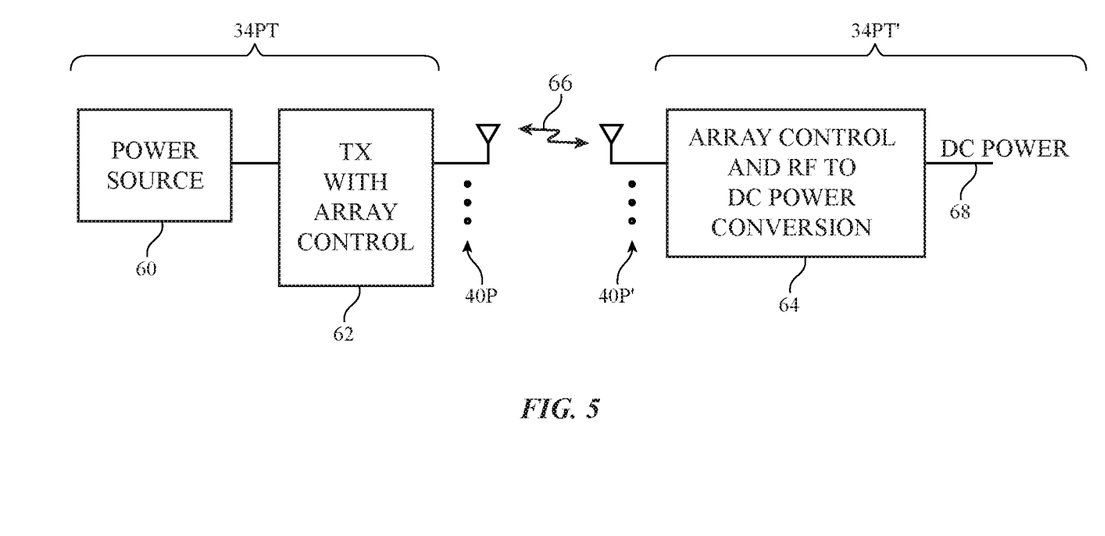
FIG. 5 is a circuit diagram of illustrative wireless charging circuitry in accordance with an embodiment.

Wireless power may be transmitted and received using circuitry of the type shown in FIG. 5. Wireless power transmitter circuitry 34PT may transmit power wirelessly over link 66 using one or more antennas 40P (e.g., an array of antennas). Wireless power receiver circuitry 34PT' may receive the wirelessly transmitted power using one or more antennas 40P' (e.g., an array of antennas). Circuitry 34PT may include a power source such as power source 60 (e.g., a wall outlet, a battery, etc.). Source 60 may supply power to circuitry 62. Circuitry 62 may include radio-frequency transmitter circuitry and circuitry (such as the adjustable phase and amplitude circuitry of circuitry 34-2 of FIG. 4 or other circuitry) for controlling the transmission of power wirelessly over link 66 using the array of antenna(s) 40P or using a single antenna. Antenna(s) 40P' may form an antenna array or may be based on a single antenna that circuitry 34PT' uses in receiving the wirelessly transmitted power over wireless link 66'. Circuitry 64 may include radio-frequency receiver circuitry and circuitry (such as the adjustable phase and amplitude circuitry of circuitry 34-2 of FIG. 4 or other wireless circuitry) for controlling the reception of power wirelessly over link 66 using the array of antenna(s) 40P' and for converting this received radio-frequency power to direct current (DC) power on output path 68. Circuitry 64 may include DC-to-DC power converter circuitry for adjusting the DC voltage supplied on path 68.

Figure 6:
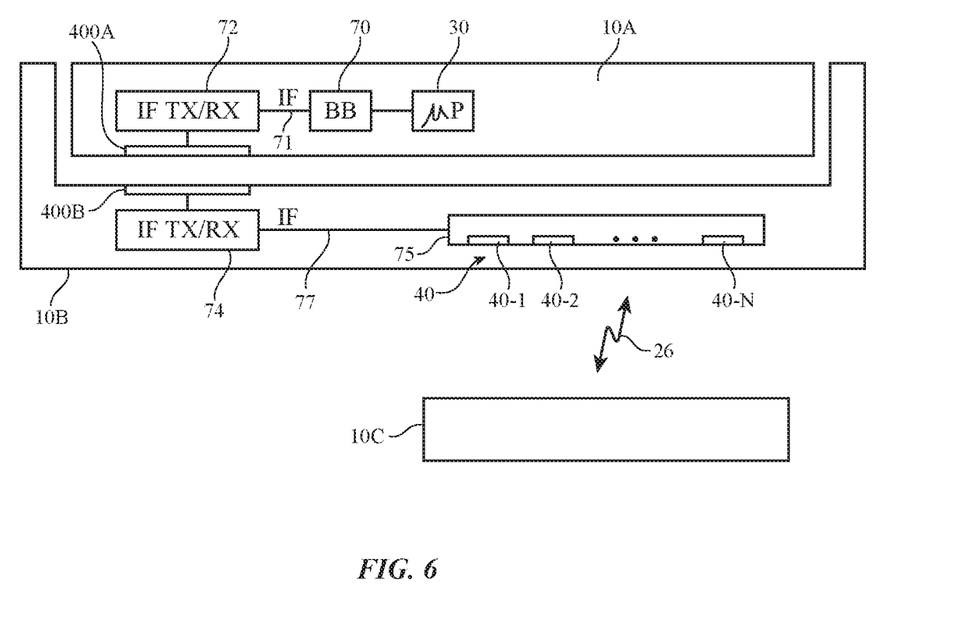
FIG. 6 is a side view of an illustrative communications system in which intermediate frequency signals may be wirelessly transmitted between an electronic device and associated accessory case in accordance with an embodiment.

If desired, intermediate frequency signals IF such as signals IF of FIG. 3 may be conveyed wirelessly between different devices (e.g., to support communications in millimeter wave communications bands or at other suitable frequencies). An illustrative configuration in which a wireless path is used in conveying intermediate frequency (IF) signals between device 10A and case 10B is shown in FIG. 6. As shown in FIG. 10, device 10A may include control circuitry 30 that is coupled to intermediate frequency transceiver circuitry 72 by circuitry such as baseband processor integrated circuit 70 or other baseband circuitry. Control circuitry 30 can generate and consume data signals. Baseband processor circuitry 70 can convert signals from control circuitry 30 into intermediate frequency signals IF on path 71, as described in connection with the intermediate frequency path between baseband processor 34-1 and phased array transceiver circuitry 34-2 in FIG. 3. Intermediate frequency transceiver circuitry 72 may be coupled to intermediate frequency antenna 400A in device 10A. Antenna 400A may communicate wirelessly with a corresponding antenna such as antenna 400B in case 10B. Antennas 400A and 400B may communicate using near field communications (i.e., antennas 400A and 400B may be patch antennas or other antennas that are electromagnetically near field coupled, may be loop antennas that are inductively near field coupled, may be capacitor plate structures or other near field antenna structures that are capacitively near field coupled, etc.). Intermediate frequency transceiver circuitry 74 in case 10B may be coupled to antenna 400B.

During operation, device 10A may use transceiver circuitry 72 and antenna 400A to transmit and/or receive IF signals that are received and/or transmitted by antenna 400B and transceiver circuitry 74 in case 10B.

In case 10B, intermediate frequency signal path 77 may convey IF signals between transceiver circuitry 74 and circuitry 75. Circuitry 75 may be implemented on a semiconductor device (e.g., an integrated circuit such as a silicon die) or may be formed from one or more devices mounted on a printed circuit or other substrate. Circuitry 75 may include upconverter/downcoverter circuitry and transceiver circuitry coupled to path 77, for converting IF signals from path 77 to radio-frequency signals for transmission over an antenna array formed from antennas 40-1, 40-2, . . . 40-N (i.e., antenna array 40) and for receiving radio-frequency signals from antenna array 40 and converting received radio-frequency signals from the antenna array to intermediate frequency signals for path 77. Circuitry 75 may include circuitry such as phased array transceiver circuitry 34-2 of FIG. 3 for implementing beam steering. The antennas of array 40 of FIG. 6 may communicate wirelessly with one or more antennas in external equipment 10C over wireless link 26.

Any suitable communications bands may be supported over link 26. As an example, circuitry 75, the antennas of array 40, wireless link 26, and the transceiver circuitry in equipment 10 may be used to support wireless communications in extremely high frequency (EHF) bands at 60 GHz (or at 24 GHz or other millimeter wave communications bands, frequencies above 60 GHz, etc.). Communications may also be supported at IEEE 802.11 wireless local area network bands such as the bands at 2.4 GHz, 5 GHz, bands at frequencies below 100 MHz such as NFC bands, etc.

Figure 7:
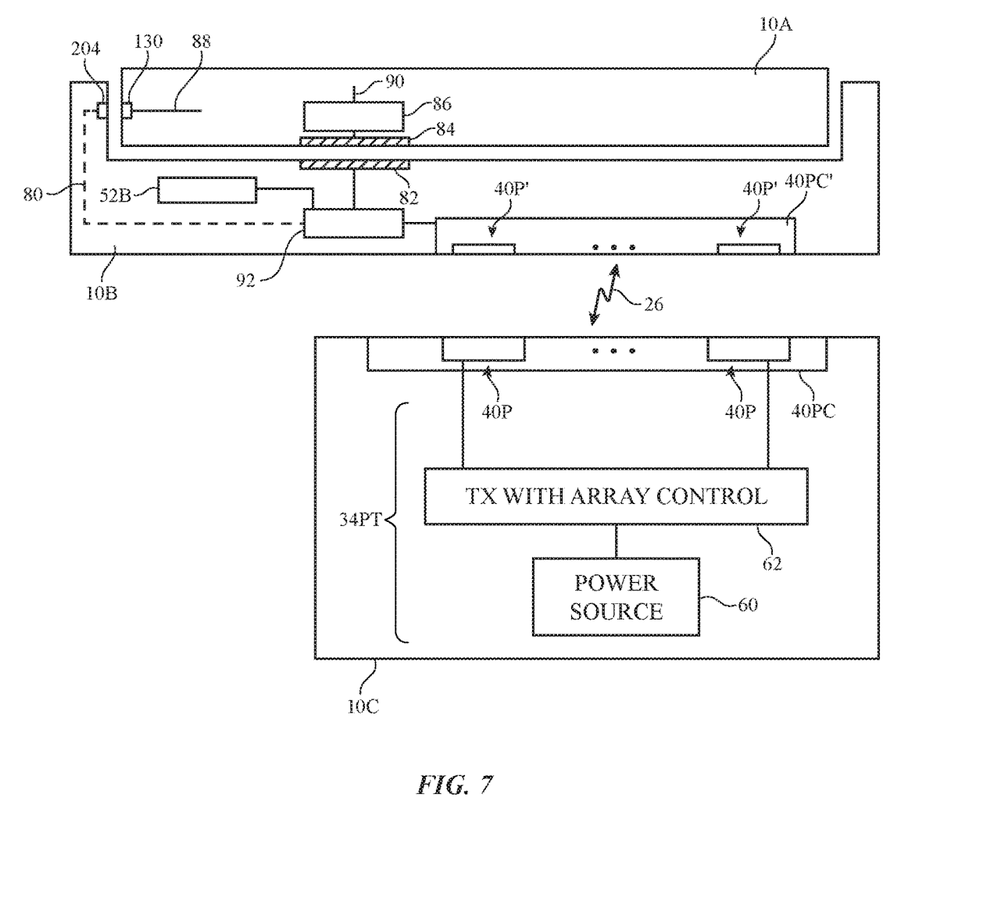
FIG. 7 is a side view of an illustrative system in which wireless power is transferred from external equipment to an electronic device using wireless charging circuitry in an accessory case in accordance with an embodiment.

If desired, power may be conveyed wirelessly from equipment 10C. An illustrative configuration for charging electronic device 10A wirelessly using equipment 10C and case 10B is shown in FIG. 7. In the example of FIG. 7, equipment 10C has power transmission circuitry 34PT that is coupled to an array of one or more antennas 40P in equipment 10C. Antennas 40P may, as an example, be antennas that operate at 2.4 GHz, 5 GHz, other microwave frequencies, or other suitable frequencies (as examples). Antennas 40P may be supported by one or more printed circuits and/or may be formed as part of one or more integrated circuits. For example, antennas 40P may be mounted on a printed circuit substrate such as illustrative printed circuit 40PC. Antennas 40P may convey wireless power to a corresponding set of antennas 40P' in case 10B. Antennas 40P' may include one or more antennas (e.g., an array of antennas) and may be implemented on one or more semiconductor dies and/or mounted on one or more printed circuit board substrates (see, e.g., substrate 40PC').

Circuitry 34PT of equipment 10C may transmit power wirelessly to case 10B over wireless path 26. Power for circuitry 34PT may be supplied using a power source such as power source 60. Power source 60 may provide alternating current (AC) power from a wall outlet or may be based on a battery. Transmitter circuitry 62 (e.g., a transmitter with circuitry for controlling a phased antenna array such as antenna array 40P) may be used to wirelessly transmit power that has been received from power source 60 to case 10B over wireless path 26 with antenna array 40P, as described in connection with circuitry 62 of FIG. 5.

Case 10B may include circuitry such as circuitry 92 for receiving radio-frequency power signals from antenna array 40P' and for converting this circuitry to DC power (see, e.g., circuitry 34PT' of FIG. 5). DC power from circuitry 92 may be provided to battery 52B to charge battery 52B and may be conveyed to device 10A using a wired path (e.g., via path 80, connector 204 of case 10B and via connector 130 and path 88 of device 10A). Alternatively, or in combination with transferring power from case 10B to device 10A using a wired path, power can be transferred wirelessly. For example, circuitry 92 of case 10B can include transmitter circuitry such as circuitry 62 of FIG. 3 that is coupled to an antenna such as antenna 82 that is near-field coupled to antenna 84 in device 10A. Circuitry 92 can use antenna 82 to convey power wirelessly to antenna 84 in device 10A (e.g., at 2.4 GHz, at 5 GHz, at other microwave frequencies, or at other frequencies). Antenna 84 may be coupled to circuitry 86 (e.g., power conversion circuitry such as circuitry 64 of FIG. 5). Circuitry 86 may convert received radio-frequency power signals from antenna structure 84 to DC power on path 90. Antennas such as antennas 82 and 84 may be patch antennas or other antennas that are electromagnetically near field coupled, may be loop antennas that are inductively near field coupled, may be capacitor plate structures or other structures that are capacitively near field coupled, or may be other suitable wireless power transfer structures.

If desired, case 10B may include both wireless communications antennas such as antenna array 40 of FIG. 6 and wireless charging antennas such as antenna array 40P' of FIG. 7. Shared antenna structures or separate sets of antennas may be used in forming the wireless communications antennas and wireless charging antennas in configurations in which case 10B contains both wireless communications and wireless charging antennas.

The foregoing is merely illustrative and various modifications can be made by those skilled in the art without departing from the scope and spirit of the described embodiments. The foregoing embodiments may be implemented individually or in any combination.

What is claimed is:

1. A removable electronic device case that is configured to mate with an electronic device and that supports wireless communications with external equipment, comprising:
   a body configured to mate with the electronic device;
   millimeter wave transceiver circuitry in the body; and
   a phased antenna array with which the millimeter wave transceiver circuitry transmits radio-frequency signals to the external equipment at a frequency between 10 GHz and 400 GHz, wherein the millimeter wave transceiver circuitry performs beam steering operations using the phased antenna array.

2. The removable electronic device case defined in claim 1 wherein the millimeter wave transceiver circuitry and the array of antennas are configured to transmit the radio-frequency signals to the external equipment in an extremely high frequency band.

3. The removable electronic device case defined in claim 1 wherein the millimeter wave transceiver circuitry and the array of antennas are configured to transmit the radio-frequency signals to the external equipment in a 60 GHz frequency band.

4. The removable electronic device case defined in claim 1 further comprising an integrated circuit that includes the antenna array and the millimeter wave transceiver circuitry.

5. The removable electronic device case defined in claim 4 further comprising an intermediate frequency antenna structure and an intermediate frequency transceiver circuit coupled to the intermediate frequency antenna structure, wherein the intermediate frequency antenna structure and intermediate frequency transceiver circuit wirelessly communicate with the electronic device using intermediate frequency wireless signals.

6. The removable electronic device case defined in claim 5 wherein the millimeter wave transceiver circuitry includes upconverter circuitry that converts intermediate frequency signals from the intermediate frequency transceiver circuit to the radio-frequency signals that the millimeter wave transceiver circuitry transmits to the external equipment with the antenna array.

7. The removable electronic device case defined in claim 6 wherein the millimeter wave transceiver circuitry includes downconverter circuitry that converts radio-frequency signals that the millimeter wave transceiver circuitry receives from the antenna array to intermediate frequency signals that are received from the millimeter wave transceiver circuitry by the intermediate frequency transceiver circuit.

8. The removable electronic device case defined in claim 7 wherein the intermediate frequency antenna structure is near field coupled to a corresponding intermediate frequency antenna structure in the electronic device.

9. The removable electronic device case defined in claim 8 further comprising circuitry in the body including at least one antenna and radio-frequency-to-direct-current power conversion circuitry that receive radio-frequency wireless power signals from external circuitry and that convert the received radio-frequency wireless power signals into direct current power that is supplied to the electronic device.

10. The removable electronic device case defined in claim 9 wherein the at least one antenna and radio-frequency-to-direct-current power conversion circuitry are configured to receive radio-frequency power wireless power signals at a frequency between 10 kHz and 100 MHz.

11. A removable electronic device case that is configured to mate with an electronic device and that receives wireless power from external equipment, comprising:
 a body configured to mate with the electronic device;
 circuitry in the body that includes at least one antenna and radio-frequency-to-direct-current power conversion circuitry that receives radio-frequency wireless power signals from the external equipment and that converts the received radio-frequency wireless power signals into direct current power that is supplied to the electronic device;
 a connector in the body that is coupled to the electronic device, wherein the circuitry is configured to provide the direct current power to the electronic device through the connector; and
 an antenna structure that is wirelessly coupled to the electronic device, wherein the circuitry is configured to wirelessly supply power to the electronic device through the antenna structure.

12. The removable electronic device case defined in claim 11 wherein the at least one antenna is configured to receive wave wireless power signals at a frequency between 10 kHz and 100 MHz from the external equipment.

13. The removable electronic device case defined in claim 12 wherein the at least one antenna comprises an array of antennas.

14. The removable electronic device case defined in claim 11 wherein the at least one antenna is configured to receive wireless power signals from the external equipment at a frequency selected from the group consisting of 2.4 GHz and 5 GHz.

15. The removable electronic device case defined in claim 11 wherein the at least one antenna is configured to receive wireless power signals from the external equipment at a frequency above 60 GHz.

16. The removable electronic device case defined in claim 11 further comprising an integrated circuit that contains a 60 GHz antenna array that wirelessly communicates in a 60 GHz communications band.

17. The removable electronic device case defined in claim 11, further comprising:
 a battery, wherein the circuitry is configured to provide the direct current power to the battery to charge the battery.

18. A removable electronic device case, comprising:
 a millimeter wave transceiver;
 an array of antennas coupled to the millimeter wave transceiver that transmit and receive wireless signals in a millimeter wave communications band;
 at least one antenna structure that receives wireless power at a frequency between 10 kHz and 100 MHz; and
 a battery that is charged using the received wireless power.

19. A removable electronic device case that is configured to mate with an electronic device and that supports wireless communications with external equipment, comprising:
 a body configured to mate with the electronic device;
 radio-frequency transceiver circuitry in the body;
 an array of antennas with which the radio-frequency transceiver circuitry wirelessly communicates with the external equipment; and
 an intermediate frequency antenna structure and an intermediate frequency transceiver circuit coupled to the intermediate frequency antenna structure, wherein the radio-frequency transceiver circuitry and the array of antennas are configured to wirelessly communicate with the external equipment in a first frequency band and the intermediate frequency antenna structure and intermediate frequency transceiver circuit wirelessly communicate with the electronic device using intermediate frequency wireless signals in a second frequency band that is lower than the first frequency band.

* * * * *